(12) United States Patent
Izumi et al.

(10) Patent No.: US 11,666,890 B2
(45) Date of Patent: Jun. 6, 2023

(54) POROUS CERAMIC STRUCTURE

(71) Applicant: NGK INSULATORS, LTD., Nagoya (JP)

(72) Inventors: Yunie Izumi, Nagoya (JP); Kenichi Hidaka, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 555 days.

(21) Appl. No.: 16/807,397

(22) Filed: Mar. 3, 2020

(65) Prior Publication Data

US 2020/0290017 A1 Sep. 17, 2020

(30) Foreign Application Priority Data

Mar. 14, 2019 (JP) .............................. JP2019-047594

(51) Int. Cl.
| | |
|---|---|
| *B01J 23/34* | (2006.01) |
| *B01J 21/04* | (2006.01) |
| *B01J 35/04* | (2006.01) |
| *B01J 35/02* | (2006.01) |
| *B01J 35/06* | (2006.01) |
| *B01D 53/94* | (2006.01) |

(52) U.S. Cl.
CPC .............. *B01J 23/34* (2013.01); *B01J 21/04* (2013.01); *B01J 35/026* (2013.01); *B01J 35/04* (2013.01); *B01J 35/06* (2013.01); *B01D 53/944* (2013.01); *B01D 53/9431* (2013.01); *B01D 2255/2073* (2013.01); *B01D 2255/20776* (2013.01)

(58) Field of Classification Search
None
See application file for complete search history.

(56) References Cited

U.S. PATENT DOCUMENTS

| | | | |
|---|---|---|---|
| 2011/0107745 A1 | 5/2011 | Mori et al. | |
| 2017/0274357 A1 | 9/2017 | Izumi | |
| 2017/0304808 A1 | 10/2017 | Izumi et al. | |
| 2018/0057407 A1 | 3/2018 | Izumi | |

FOREIGN PATENT DOCUMENTS

| | | |
|---|---|---|
| CN | 106362733 A | 2/2017 |
| CN | 107778022 A | 3/2018 |
| JP | 2006-068661 A | 3/2006 |

(Continued)

OTHER PUBLICATIONS

Mori et al., JP 2009-045584, English Translation from J-PlatPat (Year: 2009).*

(Continued)

*Primary Examiner* — Colin W. Slifka
(74) *Attorney, Agent, or Firm* — Burr Patent Law, PLLC

(57) ABSTRACT

A porous ceramic structure with low pressure loss and high catalytic performance is provided. The porous ceramic structure includes a porous structure body (i.e., honeycomb structure) composed primarily of cordierite, and manganese (Mn) and tungsten (W) that are fixedly attached to the honeycomb structure. Thus, pressure loss in the porous ceramic structure can be reduced, and an NO combustion temperature in the porous ceramic structure can be lowered. In other words, the aforementioned structure of the porous ceramic structure allows the porous ceramic structure to have low pressure loss and high catalytic performance.

7 Claims, 6 Drawing Sheets

(56) References Cited

FOREIGN PATENT DOCUMENTS

| JP | 2009045584 A | * | 3/2009 | ........... B01D 53/944 |
|----|--------------|---|--------|------------------------|
| JP | 2017-171543 A1 | | 9/2017 | |
| JP | 2017-186220 A1 | | 10/2017 | |
| JP | 2018-030105 A1 | | 3/2018 | |

OTHER PUBLICATIONS

Japanese Office Action (Application No. 2019-047594) dated Aug. 25, 2022 (with English translation).
Chinese Office Action dated Mar. 10, 2023 (Appl. No. 202010118452.5).

* cited by examiner ents of a metal oxide particle fixedly attached to an inside
POROUS CERAMIC STRUCTURE This application claims priority benefit under 35 U.S.C. Section 119 of Japanese Patent Application No. JP 2019-047594 filed in the Japan Patent Office on Mar. 14, 2019, the entire disclosure of which is incorporated herein by reference.

TECHNICAL FIELD

The present invention relates to a porous ceramic structure.

BACKGROUND ART

Japanese Patent Application Laid-Open No. 2017-186220 (Patent Document 1) proposes cerium dioxide particles that contain therein or thereon a transition-metal oxide containing iron and manganese. It is assumed that such cerium dioxide particles are used as an oxidation catalyst in, for example, a diesel particulate filter (DPF) that includes a diesel oxidation catalyst (DOC) and a catalyzed soot filter (CSF).

Japanese Patent Application Laid-Open Nos. 2018-30105 (Document 2) and 2017-171543 (Document 3) propose techniques that allow a sufficient amount of catalyst to be supported in porous ceramic structures used in DPFs or other measures in order to maintain a catalytic activity. In the porous ceramic structures, portions of cerium dioxide particles are taken into the structures and the other portions of the cerium dioxide particles are exposed to the surfaces of pores in the structures. In the porous ceramic structure according to Document 2, the portions of cerium dioxide particles that are exposed to the surfaces of pores contain an iron oxide. In the porous ceramic structure according to Document 3, the portions of cerium dioxide particles that are exposed to the surfaces of pores support fine catalyst particles of an element of the platinum group.

The porous ceramic structures used in DPFs or other measures are required to achieve both a reduction in pressure loss and an improvement in catalytic performance.

SUMMARY OF INVENTION

The present invention is intended for a porous ceramic structure, and it is an object of the present invention to provide a porous ceramic structure with low pressure loss and high catalytic performance.

A porous ceramic structure according to a preferred embodiment of the present invention includes a porous structure body composed primarily of cordierite, and manganese and tungsten fixedly attached to the structure body.

Accordingly, it is possible to provide a porous ceramic structure with low pressure loss and high catalytic performance.

Preferably, the manganese and the tungsten are components of a metal oxide particle fixedly attached to an inside of a pore of the structure body. The metal oxide particle has a fixedly attached portion located inside the structure body, and a protrusion contiguous with the fixedly attached portion and protruding into the pore.

Preferably, the porous ceramic structure has a tungsten content higher than or equal to 0.1 mass % and lower than or equal to 1.5 mass % in terms of $WO_3$.

Preferably, the porous ceramic structure has a manganese content higher than or equal to 0.5 mass % and lower than or equal to 3.0 mass % in terms of $Mn_2O_3$.

Preferably, the metal oxide particle includes an $MnWO_4$ particle.

Preferably, the porous ceramic structure has an $MnWO_4$ content higher than or equal to 0.2 mass % and lower than or equal to 2.0 mass %.

Preferably, the $MnWO_4$ particle has an aspect ratio higher than or equal to 5.5.

Preferably, the $MnWO_4$ particle has a particulate or fibrous shape. The $MnWO_4$ particle has the fixedly attached portion existing at a grain boundary of cordierite crystals in the structure body, and the protrusion protruding from the grain boundary into the pore.

These and other objects, features, aspects and advantages of the present invention will become more apparent from the following detailed description of the present invention when taken in conjunction with the accompanying drawings.

DESCRIPTION OF EMBODIMENTS

Figure 1:
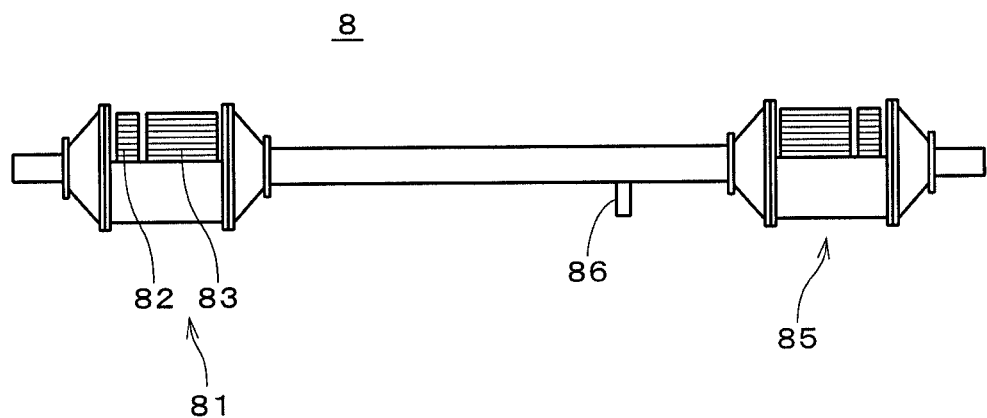
FIG. 1 illustrates a configuration of an exhaust gas purification system.

FIG. 1 illustrates a configuration of an exhaust gas purification system 8. The exhaust gas purification system 8 is configured to purify an exhaust gas emitted from an engine. The exhaust gas purification system 8 includes a diesel particulate filter (DPF) 81, a selective catalytic reduction (SCR) catalytic converter 85, and an urea injector 86. The DPF 81, the urea injector 86, and the SCR catalytic converter 85 are arranged in this order in the direction of flow of the exhaust gas.

The DPF 81 includes a diesel oxidation catalyst (DOC) 82 and a catalyzed soot filter (CSF) 83. The DOC 82 includes a honeycomb structure whose interior is partitioned into a plurality of cells by a partition wall, and a precious-metal oxidation catalyst supported by the partition wall. The CSF 83 includes a honeycomb structure similar to the aforementioned structure and a metal oxidation catalyst supported by a partition wall of the honeycomb structure. The structure of the CSF 83 will be described later in detail. The urea injector 86 is provided in a path of the exhaust gas between the DPF 81 and the SCR catalytic converter 85. The SCR catalytic converter 85 includes a honeycomb structure similar to the aforementioned structure and an SCR catalyst supported by a partition wall of the honeycomb structure.

The exhaust gas emitted from the engine flows into the DOC 82 of the DPF 81. The exhaust gas contains nitrogen monoxide (NO), oxygen ($O_2$), and nitrogen ($N_2$) and undergoes reactions expressed by Equations 1 and 2 below in the DOC 82. The reaction expressed by Equation 1 generates nitrogen dioxide ($NO_2$). In Equation 2 below, a soluble organic fraction (SOF) is contained in particulate matter (PM) in the exhaust gas.

$$2NO+O_2=2NO_2 \tag{1}$$

$$SOF+O_2=CO,CO_2,H_2O \tag{2}$$

The CSF 83 collects carbon (soot) contained in the exhaust gas. In the CSF 83, the soot and $NO_2$ undergo reactions (combustion reactions) expressed by Equations 3, 4, and 5 below, so that NO is generated from $NO_2$.

$$C\,(soot)+2NO_2=CO_2+2NO \tag{3}$$

$$C\,(soot)+NO_2=CO+NO \tag{4}$$

$$C\,(soot)+\tfrac{1}{2}O_2+NO_2=CO_2+NO \tag{5}$$

The urea injector 86 mixes urea into the exhaust gas emitted from the CSF 83, and the exhaust gas that contains ammonia ($NH_3$) generated by decomposition of the urea flows into the SCR catalytic converter 85. In the SCR catalytic converter 85, reactions expressed by Equations 6, 7, and 8 below occur, so that NOx contained in the exhaust gas is purified.

$$4NO+4NH_3+O_2=4N_2+6H_2O \tag{6}$$

$$NO+NO_2+2NH_3=2N_2+3H_2O \tag{7}$$

$$6NO_2+8NH_3=7N_2+12H_2O \tag{8}$$

The reaction expressed by Equation 7 is called a fast SCR reaction and proceeds at a higher reaction rate than the reactions expressed by Equations 6 and 8. In order to improve the efficiency of the reactions occurring in the SCR catalytic converter 85 in accordance with Equation 7, the ratio between the amounts of substances of NO and $NO_2$, which flow into the SCR catalytic converter 85, is required to be 1:1. Meanwhile, the CSF 83 consumes a large amount of $NO_2$ in the combustion of soot and generates NO as expressed by Equations 3, 4, and 5 described previously.

In view of this, the exhaust gas purification system 8 according to the present invention includes, as the CSF 83, a porous ceramic structure (described later) that includes an oxidation catalyst. The porous ceramic structure oxidizes part of NO to generate $NO_2$, i.e., converts NO into $NO_2$. This allows the ratio between the amounts of substances of NO and $NO_2$, which flow into the SCR catalytic converter 85, to become closer to 1:1 and improves the efficiency of the reactions occurring in the SCR catalytic converter 85.

In the case where a certain amount or more of soot is deposited on the CSF 83, the exhaust gas purification system 8 performs processing for burning the soot (i.e., regeneration). In this case as well, the reactions (combustion reactions) expressed by Equations 3, 4, and 5 occur in the CSF 83. If the carbon monoxide (CO) generated by the reactions flows in large amounts into the SCR catalytic converter 85, the NOx purification efficiency of the SCR catalytic converter 85 may decline. The same applies to the case where hydrocarbon (HC) contained in the fuel supplied to the CSF 83 flows in large amounts into the SCR catalytic converter 85 during the processing for burning the soot.

In the exhaust gas purification system 8 according to the present invention, since the porous ceramic structure including the aforementioned oxidation catalyst is provided as the CSF 83, part of CO is oxidized into carbon dioxide ($CO_2$), and part of HC is oxidized into $CO_2$ and $H_2O$. This suppresses the flow of CO, HC, and other substances into the SCR catalytic converter 85 and suppresses a decline in the $NO_x$ purification efficiency of the SCR catalytic converter 85.

Figure 2:
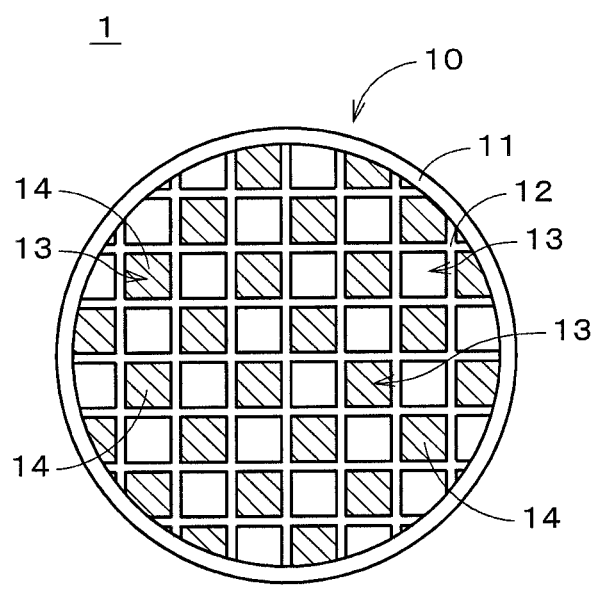
FIG. 2 illustrates a porous ceramic structure.
Figure 3:
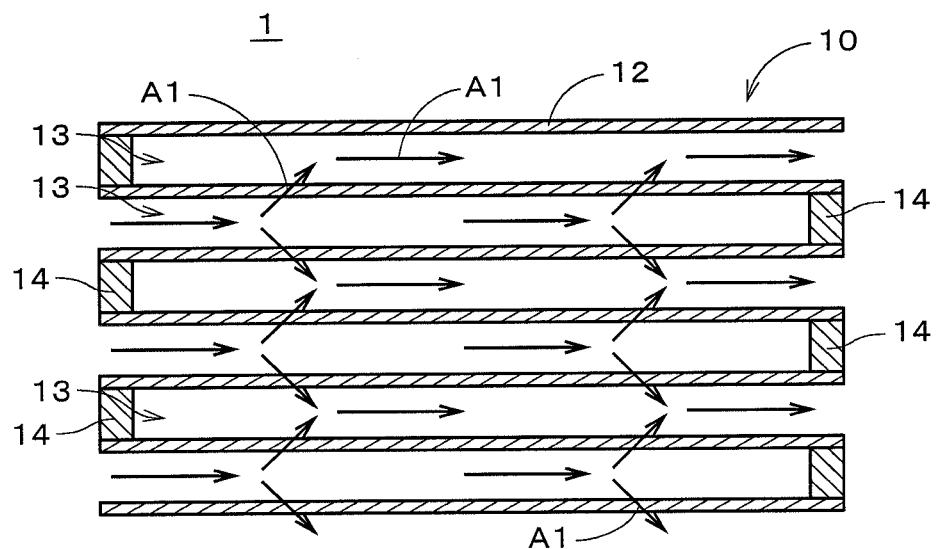
FIG. 3 is a sectional view of the porous ceramic structure.

FIGS. 2 and 3 are simplified diagrams of a porous ceramic structure 1 used as the CSF 83 (see FIG. 1). The porous ceramic structure 1 is a tubular member that is long in one direction, and FIG. 2 illustrates the end face on one side of the porous ceramic structure 1 in the longitudinal direction. FIG. 3 is a sectional view of the porous ceramic structure 1 and illustrates part of a section taken along the longitudinal direction of the porous ceramic structure 1.

The porous ceramic structure 1 includes a honeycomb structure 10 serving as a porous structure body, and an oxidation catalyst fixedly attached to the honeycomb structure 10. The oxidation catalyst is preferably metal oxide particles (i.e., fine particles composed primarily of a metal oxide) fixedly attached to the honeycomb structure 10. The metal oxide particles contain manganese (Mn) elements and tungsten (W) elements as components. In the porous ceramic structure 1, in addition to the aforementioned metal oxide particles, fine particles other than the metal oxide particles may also be fixedly attached to the honeycomb structure 10.

The honeycomb structure 10 includes a tubular outer wall 11 and a partition wall 12. The tubular outer wall 11 has a tubular shape extending in the longitudinal direction. A cross-sectional shape of the tubular outer wall 11 that is perpendicular to the longitudinal direction may, for example, be circular, or may be polygonal or any other shape. The partition wall 12 is provided in the interior of the tubular outer wall 11 and partitions the interior into a plurality of cells 13. The honeycomb structure 10 is a cell structure whose interior is partitioned into a plurality of cells 13 by the partition wall 12. The tubular outer wall 11 and the partition wall 12 are made of a porous material. As will be described later, the exhaust gas passes through pores of the partition wall 12. In order to increase the strength of the porous ceramic structure 1, the thickness of the partition wall 12 is, for example, greater than or equal to 50 micrometers (m), preferably greater than or equal to 100 μm, and more preferably greater than or equal to 150 μm. In order to reduce pressure loss in the partition wall 12, the thickness of the partition wall 12 is, for example, less than or equal to 500 μm and preferably less than or equal to 450 μm.

Each cell 13 is a space extending in the longitudinal direction. Cross-sectional shapes of the cells 13 that are perpendicular to the longitudinal direction may, for example, be polygonal (e.g., triangular, quadrangular, pentagonal, or hexagonal), or may be circular or any other shape. The cells 13 typically have the same cross-sectional shape. Alternatively, the cells 13 may include cells 13 that have different cross-sectional shapes. In order to improve oxidation performance of the porous ceramic structure 1, the density of the cells (cell density) is, for example, higher than or equal to 8 cells per square centimeters (cells/$cm^2$) and preferably higher than or equal to 15 cells/$cm^2$. In order to reduce pressure loss, the cell density is, for example, lower than or equal to 95 cells/$cm^2$ and preferably lower than or equal to 78 cells/$cm^2$.

In the porous ceramic structure 1 used in the CSF 83, the exhaust gas from the DOC 82 flows, using one end in the longitudinal direction of the honeycomb structure 10 as an inlet and the other end thereof as an outlet. A predetermined number of cells 13 are each provided with a sealer 14 at its end on the inlet side, and the remaining cells 13 are each provided with a sealer 14 at its end on the outlet side. Therefore, the exhaust gas that flows into the honeycomb structure 10 flows from the cells 13 having inlets that are not sealed through the partition wall 12 to the cells 13 having outlets that are not sealed (see arrows A1 in FIG. 3). At this time, the exhaust gas is oxidized by the metal oxide particles (i.e., oxidation catalyst) on the partition wall 12. At each of the inlet- and outlet-side ends of the honeycomb structure 10, it is preferable that the sealers 14 are alternately provided in the direction of arrangement of the cells 13.

The honeycomb structure 10 is composed primarily of cordierite ($2MgO \cdot 2Al_2O_3 \cdot 5SiO_2$). The honeycomb structure 10 may be composed of only cordierite, or may contain materials (e.g., metal or ceramic other than cordierite) other than cordierite. The cordierite content in the honeycomb structure 10 is, for example, higher than or equal to 75 mass % and preferably higher than or equal to 80 mass %. In the present embodiment, the honeycomb structure 10 is substantially composed of only cordierite.

Figure 4:
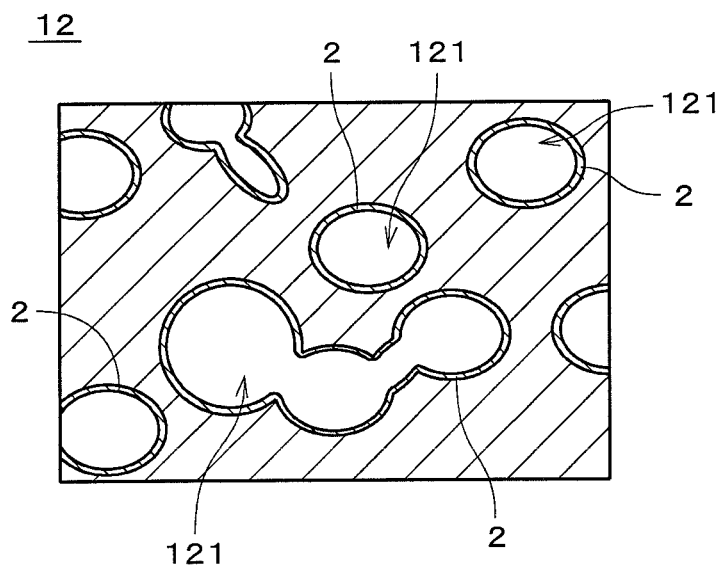
FIG. 4 is an enlarged view of part of a partition wall.

FIG. 4 is an enlarged view of part of the partition wall 12 in the porous ceramic structure 1. The honeycomb structure 10 has a large number of gas cavities (hereinafter, also referred to as "pores 121"). The aforementioned metal oxide particles 2 are fixedly attached to the insides of the pores 121 (i.e., the surfaces of the pores) in the honeycomb structure 10. Other particles (hereinafter, referred to as "additive fine particles") different from the metal oxide particles 2 may also be fixedly attached to the insides of the pores 121. The additive fine particles are, for example, fine particles containing cerium (Ce) and/or iron (Fe) elements. The additive fine particles are, for example, iron oxide ($Fe_2O_3$) fine particles and/or cerium dioxide ($CeO_2$) particles. FIG. 4 schematically illustrates the metal oxide particles 2 and the additive fine particles on the surfaces of the pores 121 by cross hatching without distinguishing between them. Note that the metal oxide particles 2 and the additive fine particles do not necessarily have to cover the entire surfaces of the pores 121.

In order to reduce pressure loss in the porous ceramic structure 1, the open porosity of the partition wall 12 in the honeycomb structure 10 is, for example, higher than or equal to 25%, preferably higher than or equal to 30%, and more preferably higher than or equal to 35%. From the viewpoint of ensuring the strength of the porous ceramic structure 1, the open porosity of the partition wall 12 is, for example, lower than or equal to 70% and preferably lower than or equal to 65%. The open porosity can be measured by, for example, the Archimedes method using deionized water as a medium.

The mean pore diameter of the partition wall 12 in the honeycomb structure 10 is, for example, greater than or equal to 5 μm and preferably greater than or equal to 8 As the mean pore diameter of the partition wall 12 increases like the open porosity, pressure loss in the porous ceramic structure 1 decreases. In order to improve the oxidation performance of the porous ceramic structure 1, the mean pore diameter of the honeycomb structure 10 is, for example, less than or equal to 40 μm, preferably less than or equal to 30 μm, and more preferably less than or equal to 25 μm. The mean pore diameter can be measured by, for example, mercury injection (in accordance with JIS R1655). Depending on the design of the porous ceramic structure 1, the sealers 14 may be omitted, and the metal oxide particles 2 may be held in a layer on the surfaces of the cells 13.

Figure 5:
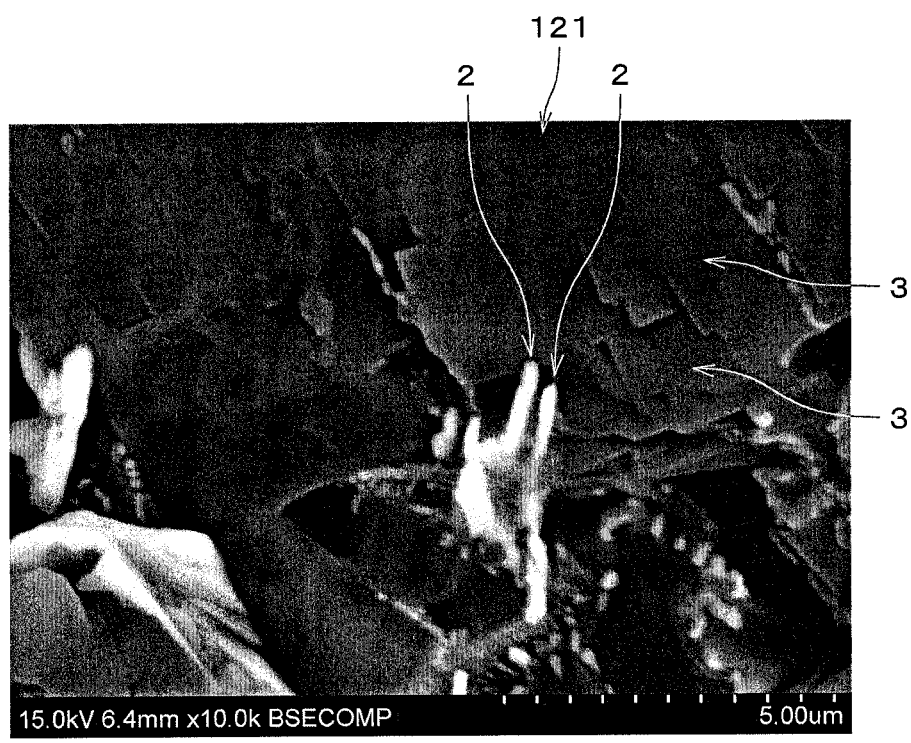
FIG. 5 shows an SEM image of the surface of a pore in a honeycomb structure.

FIG. 5 shows a scanning electron microscope (SEM) image of the surface of a pore 121 in the honeycomb structure 10. In the porous ceramic structure 1, a plurality of substantially particulate or fibrous metal oxide particles 2 are fixedly attached to the surface (i.e., inner surface) of the pore 121 in the honeycomb structure 10. The metal oxide particles 2 are fixedly attached to the grain boundaries of a large number of substantially rectangular parallelepiped cordierite crystals 3 forming the pore 121, and grow and protrude from the surface of the pore 121 into the space in the pore 121.

The metal oxide particles 2 indicated in white in approximately the central part of FIG. 5 are fine particles of manganese tungstate ($MnWO_4$). In the example illustrated in FIG. 5, the metal oxide particles 2 have a substantially fibrous shape with anisotropy. The major axes of the fine particles of $MnWO_4$ are preferably in the range of 50 nanometers (nm) to 5000 nm and more preferably in the range of 1000 nm to 4000 nm. The minor axes of the fine particles of $MnWO_4$ are preferably in the range of 50 nm to 1000 nm and more preferably in the range of 150 nm to 500 nm. The aspect ratio of the fine particles of $MnWO_4$ is preferably higher than or equal to 1.5 and more preferably higher than or equal to 5.5. Although the upper limit for the aspect ratio is not particularly limited, the aspect ratio is, for example, lower than or equal to 100 and preferably lower than or equal to 10.

The major axes, minor axes, mean particle diameter, and aspect ratio of the metal oxide particles 2 are obtained by a following method. First, the porous ceramic structure 1 is processed by a cross-section polisher (CP) to expose a polished section, and an image of this polished section is captured at a predetermined magnification (e.g., 1000 times) by an SEM. At this time, a field of view is set such that five or more metal oxide particles 2 are included within the field of view.

Figure 6:
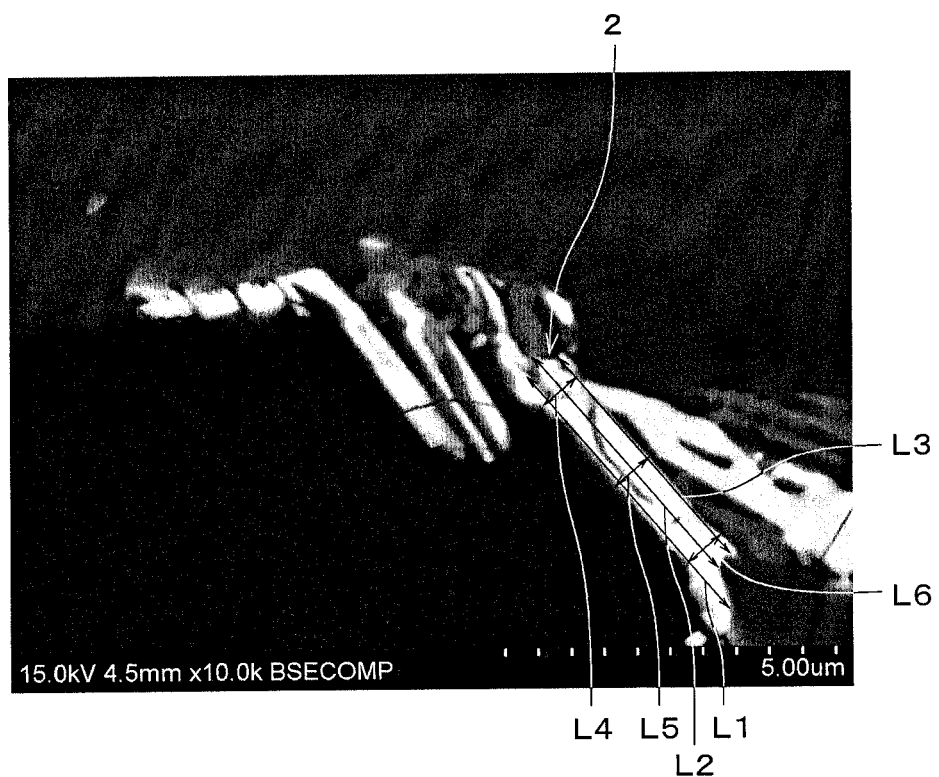
FIG. 6 shows an SEM image of the surface of a pore in the honeycomb structure.

Then, one metal oxide particle 2 in the obtained SEM image is focused on, and longitudinal lengths L1, L2, and L3 of the metal oxide particle 2 at three points in the width direction are measured as illustrated in FIG. 6. The lengths L1, L2, and L3 are measured at arbitrary three points (e.g., approximately the center and approximately the opposite ends in the width direction) in the width direction of the metal oxide particle 2. Then, an arithmetical mean of the lengths L1, L2, and L3 is defined as an assumed major axis.

Also, widths L4, L5, and L6 in the width direction of the metal oxide particle 2 at arbitrary three points in the longitudinal direction are measured, and an arithmetical mean of the widths L4, L5, and L6 is defined as an assumed minor axis. The arbitrary three points used to measure the widths L4, L5, and L6 include, for example, a point in a substantial center of the metal oxide particle 2 in the longitudinal direction and two points that are spaced by one fourth to one half of the aforementioned major axis from the substantial center. These two points are located on the opposite sides in the longitudinal direction, with the point in the substantial center of the metal oxide particle 2 in the longitudinal direction sandwiched therebetween.

The assumed major axes and assumed minor axes of the five metal oxide particles 2 in the aforementioned SEM image are obtained using the same method, and an arithmetical mean of the five assumed major axes and an arithmetical mean of the five assumed minor axes are acquired respectively as the major and minor axes of the metal oxide particles 2. Also, an arithmetical mean of the major and minor axes is defined as a mean particle diameter of the metal oxide particles 2, and a value obtained by dividing the major axis by the minor axis is acquired as the aspect ratio of the metal oxide particles 2.

In the aforementioned measurements of the major and minor axes of the metal oxide particles 2, the longitudinal directions of the metal oxide particles 2 are determined as follows. First, in the aforementioned SEM image, each metal oxide particle 2 is circumscribed by two parallel straight lines (hereinafter, referred to as a "pair of straight lines") that sandwich the metal oxide particle 2. Then, the orientation of the pair of straight lines is changed while the metal oxide particle 2 is kept circumscribed by the pair of straight lines. Then, a direction in which the pair of straight lines extends when the spacing between the pair of straight lines (i.e., distance between the pair of straight lines in a direction perpendicular to the pair of straight lines) becomes a minimum is defined as a longitudinal direction. Also, a direction perpendicular to this longitudinal direction is defined as a width direction.

The $MnWO_4$ content in the porous ceramic structure 1 is preferably higher than or equal to 0.2 mass % and less than or equal to 2.0 mass %. The $MnWO_4$ content in the porous ceramic structure 1 is more preferably higher than or equal to 0.4 mass %. This content is more preferably lower than or equal to 1.8 mass %.

Figure 7:
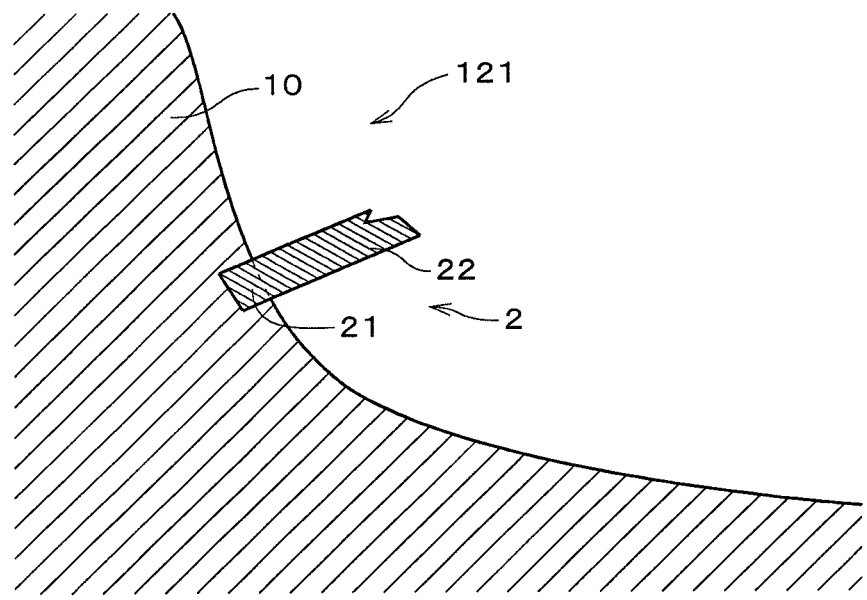
FIG. 7 is a sectional view of an area in the vicinity of a metal oxide particle.

FIG. 7 is a sectional view of an area in the vicinity of a metal oxide particle 2 on the surface of a pore 121. As illustrated in FIG. 7, the metal oxide particle 2 has a form protruding in part from the inside of the honeycomb structure 10 into the pore 121.

The metal oxide particle 2 has a fixedly attached portion 21 and a protrusion 22. The fixedly attached portion 21 is located inside the honeycomb structure 10. The language "inside the honeycomb structure 10" refers to inside the cordierite surrounding the pore 121 and does not refer to inside the pore 121 provided in the honeycomb structure 10 (i.e., internal space of the pore 121). The fixedly attached portion 21 is a bonding portion of the metal oxide particle 2 that is bonded to the cordierite serving as the principal component of the honeycomb structure 10 and that is fixedly attached to the inside of the cordierite. In other words, the fixedly attached portion 21 is a portion of the metal oxide particle 2 that crawls into the cordierite from the surface of the pore 121 in the honeycomb structure 10 to the side opposite to the pore 121 and is taken in the cordierite. In yet other words, the fixedly attached portion 21 is a portion of the metal oxide particle 2 that has a surface covered with the cordierite. To be more specific, the fixedly attached portion 21 exists at a grain boundary of cordierite crystals 3 in the honeycomb structure 10 and is fixedly attached to the grain boundary.

The protrusion 22 is a portion of the metal oxide particle 2 that protrudes in particulate or fibrous from the surface of the pore 121 into the pore 121. In other words, the protrusion 22 is a particulate or fibrous portion that is exposed from the surface of the aforementioned cordierite. To be more specific, the protrusion 22 protrudes in particulate or fibrous form from the grain boundary of cordierite crystals 3 into the pore 121. The protrusion 22 is contiguous with the fixedly attached portion 21. The major axis, minor axis, mean particle diameter, and aspect ratio of the aforementioned metal oxide particle 2 are the major axis, minor axis, mean particle diameter, and aspect ratio of the protrusion 22 that can be observed with an SEM.

Among a large number of metal oxide particles 2 contained in the porous ceramic structure 1, for example, some metal oxide particles 2 are fixedly attached to the surfaces of pores 121 inside the pores 121 as described above, and the other metal oxide particles 2 are located in their entirety inside the honeycomb structure 10. Note that substantially all of the metal oxide particles 2 may be fixedly attached to the surfaces of pores 121 inside the pores 121.

In the porous ceramic structure 1, the honeycomb structure 10 does not undergo a coating process (so-called wash coating) using γ-alumina or the like. Therefore, the surfaces of the pores 121 have no coating that is formed by the aforementioned coating process, and as a natural result, no coating intervenes in the attachment of the honeycomb structure 10 and the metal oxide particles 2.

A large number of metal oxide particles 2 fixedly attached to the honeycomb structure 10 do not necessary have to contain fine particles of $MnWO_4$ as long as they contain Mn and W as components, and may contain other metal oxide particles different from the fine particles of $MnWO_4$, instead of or in addition to the fine particles of $MnWO_4$. Even in this case, the major axis, minor axis, mean particle diameter, and aspect ratio of the metal oxide particles 2 can be obtained using the same method as described above.

The Mn content in the porous ceramic structure 1 is preferably higher than or equal to 0.5 mass % and lower than or equal to 3.0 mass % in terms of manganese oxide ($Mn_2O_3$). The Mn content in terms of $Mn_2O_3$ as used herein refers to the percentage of a value obtained by dividing the mass of $Mn_2O_3$ by the mass of the porous ceramic structure 1 in the case where it is assumed that all Mn components contained in the porous ceramic structure 1 exist as $Mn_2O_3$.

The W content in the porous ceramic structure 1 is preferably higher than or equal to 0.1 mass % and lower than or equal to 1.5 mass % in terms of tungsten oxide ($WO_3$). The W content in the porous ceramic structure 1 is preferably higher than or equal to 0.5 mass % in terms of $WO_3$. This content (i.e., the W content in terms of $WO_3$) is also more preferably lower than or equal to 1.4 mass % in terms of $WO_3$. The W content in terms of $WO_3$ as used herein refers to the percentage of a value obtained by dividing the mass of $WO_3$ by the mass of the porous ceramic structure 1 in the case where it is assumed that all W components contained in the porous ceramic structure 1 exist as $WO_3$.

In order for the porous ceramic structure 1 to achieve high catalytic performance with the metal oxide particles 2, the content of the metal oxide particles 2 in the porous ceramic structure 1 is, for example, higher than or equal to 0.1 mass %. In order to reduce pressure loss in the porous ceramic structure 1, the content of the metal oxide particles 2 in the porous ceramic structure 1 is, for example, lower than or equal to 5.0 mass %.

In other words, the amount of the metal oxide particles 2 supported in the porous ceramic structure 1 is, for example, greater than or equal to 3 grams per liter (g/L), preferably greater than or equal to 5 g/L, and more preferably greater than or equal to 8 g/L. The amount of the metal oxide particles 2 supported in the porous ceramic structure 1 is also, for example, less than or equal to 50 g/L, preferably less than or equal to 45 g/L, and more preferably less than or equal to 40 g/L. The amount (g/L) of the metal oxide particles 2 supported indicates the amount (g) of the metal oxide particles 2 supported per unit volume (L) of the honeycomb structure 10.

Figure 8:
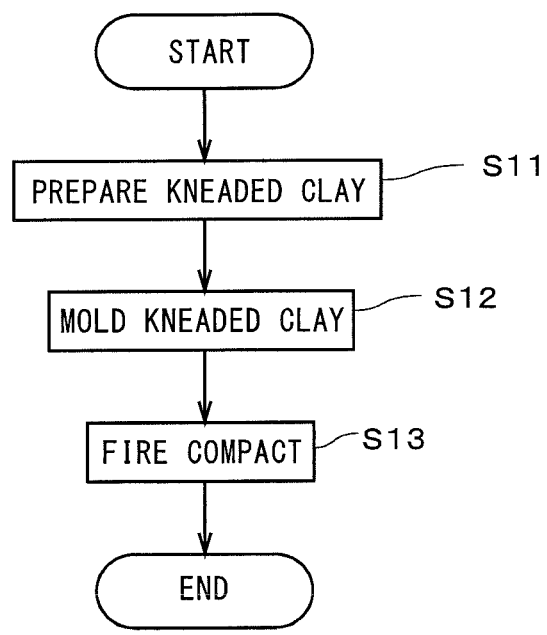
FIG. 8 is a flowchart of the method of producing the porous ceramic structure.

Next, an example of the method of producing the porous ceramic structure 1 will be described with reference to FIG. 8. In the production of the porous ceramic structure 1, first, a structure raw material is prepared by weighing and mixing materials for the honeycomb structure 10, materials for the metal oxide particles 2, and materials for the additive fine particles. The materials for the honeycomb structure 10 are composed primarily of a raw material for cordierite that serves as an aggregate of the honeycomb structure 10 and are, for example, magnesium oxide (MgO), aluminum oxide ($Al_2O_3$), and silicon oxide ($SiO_2$). The materials for the honeycomb structure 10 also include other components such as a bore-forming material and a binder. The materials for the metal oxide particles 2 are, for example, $Mn_2O_3$ and $WO_3$. The materials for the additive fine particles are, for example, $Fe_2O_3$ and $CeO_2$. Then, after the structure raw material is dry mixed in a kneader, water is charged and the structure raw material is further mixed and kneaded in the kneader to prepare kneaded clay (step S11).

The amounts of time required for the dry mixing and the kneading described above are, for example, 15 minutes and 30 minutes, respectively. The dry mixing time and the kneading time may be changed in various ways. As the aforementioned materials for the metal oxide particles 2, for example, salts such as manganese nitrate may be used instead of $Mn_2O_3$, and ammonium salt of tungsten may be used instead of $WO_3$. As the materials for the additive fine particles, for example, salts such as iron nitrate and cerium nitrate may be used instead of $Fe_2O_3$ and $CeO_2$.

In step S11, the raw materials for the metal oxide particles 2 and the raw materials for the additive fine particles are individually added to the aggregates or the like of the honeycomb structure 10, but the method of adding these raw materials may be changed in various ways. For example, a material generated by immersing the raw materials for the metal oxide particles 2 in $CeO_2$ and drying and firing the raw materials may be added to the aggregates or the like of the honeycomb structure 10. In this material, part of the raw materials for the metal oxide particles 2 may be solid-dissolved in or adhere to $CeO_2$.

The kneaded clay prepared in step S11 is molded into a columnar shape in a vacuum kneading machine or other machines and then subjected to extrusion molding to form a honeycomb compact of a honeycomb shape by an extruder (step S12). The honeycomb compact includes therein a grid-like partition wall that sections the honeycomb compact into a plurality of cells serving as flow paths for a fluid. The honeycomb compact has a honeycomb diameter of 30 mm, a partition wall thickness of 12 mil (approximately 0.3 mm), a cell density of 300 cells per square inch (cpsi), i.e., 46.5 cells/$cm^2$, and an outer wall thickness of approximately 0.6 mm. Alternatively, in step S12, the honeycomb compact may be molded by a molding method other than extrusion molding.

The honeycomb compact prepared in step S12 is subjected to microwave drying so that approximately 70% of moisture is transpired, and is then subjected to hot air drying (80° C.×12 hours). Then, the honeycomb compact is charged into a degreasing furnace that is maintained at 450° C. so as to remove (i.e., degrease) organic components remaining in the honeycomb compact. Thereafter, the honeycomb compact is subjected to a firing process (firing), so that the porous ceramic structure 1 including the honeycomb structure 10, the metal oxide particles 2, and the additive fine particles is obtained (step S13). For example, the firing process in step S13 is conducted at a firing temperature of 1300° C. to 1500° C. for eight hours under atmospheric pressure. The firing temperature is preferably higher than or equal to 1350° C. and more preferably higher than or equal to 1370° C. The firing temperature is also preferably lower than or equal to 1450° C. and more preferably lower than or equal to 1430° C. Conditions for the firing process may be appropriately changed. The porous ceramic structure 1 produced by the above-described production method does not contain precious metals, and therefore can be produced at low cost.

Next, the relationship of the content of the metal oxide particles 2 in the porous ceramic structure 1, the pressure loss, and the catalytic performance will be described with reference to Tables 1 to 3.

TABLE 1

| | Material Composition (mass %) | | | | | | | |
|---|---|---|---|---|---|---|---|---|
| | MgO | $Al_2O_3$ | $SiO_2$ | $Mn_2O_3$ | $WO_3$ | $Fe_2O_3$ | $CeO_2$ | Total |
| Example 1 | 7.2 | 40.7 | 44.2 | 2.0 | 0.1 | 2.2 | 3.6 | 100 |
| Example 2 | 7.2 | 40.6 | 44.1 | 2.0 | 0.3 | 2.2 | 3.5 | 100 |
| Example 3 | 7.1 | 40.5 | 44.0 | 2.0 | 0.6 | 2.2 | 3.5 | 100 |
| Example 4 | 7.1 | 40.2 | 43.7 | 2.0 | 1.3 | 2.2 | 3.5 | 100 |
| Example 5 | 7.6 | 43.3 | 47.1 | 0.6 | 1.4 | 0.0 | 0.0 | 100 |
| Comparative Example 1 | 7.8 | 44.2 | 48.0 | 0.0 | 0.0 | 0.0 | 0.0 | 100 |
| Comparative Example 2 | 7.2 | 40.7 | 44.3 | 2.0 | 0.0 | 2.2 | 3.6 | 100 |

TABLE 2

| | Composition of Crystalline Phases (mass %) | | | |
|---|---|---|---|---|
| | Cordierite | MnWO$_4$ | Others | Total |
| Example 1 | 88.0 | ≤Detection Limits | 12.0 | 100 |
| Example 2 | 87.0 | 0.3 | 12.7 | 100 |
| Example 3 | 85.0 | 0.4 | 14.6 | 100 |
| Example 4 | 83.0 | 0.8 | 16.2 | 100 |
| Example 5 | 88.0 | 1.5 | 10.5 | 100 |
| Comparative Example 1 | 95.0 | 0.0 | 5.0 | 100 |
| Comparative Example 2 | 90.0 | 0.0 | 10.0 | 100 |

TABLE 3

| | Dimensions of MnWO$_4$ | | | Open Porosity (%) | NO Oxidation Temperature (° C.) | Thermal Expansion Coefficient 40-800° C. |
|---|---|---|---|---|---|---|
| | Major Axis (nm) | Minor Axis (nm) | Aspect Ratio | | | |
| Example 1 | 0.1 | 0.1 | 1.4 | 62 | 500 | 0.4 |
| Example 2 | 0.7 | 0.1 | 5.2 | 62 | 490 | 0.4 |
| Example 3 | 1.2 | 0.2 | 6.7 | 62 | 480 | 0.4 |
| Example 4 | 3.5 | 0.5 | 7.1 | 61 | 480 | 0.4 |
| Example 5 | 1.7 | 0.3 | 5.7 | 60 | 460 | 0.3 |
| Comparative Example 1 | No MnWO$_4$ | | | 58 | 540 | 0.3 |
| Comparative Example 2 | No MnWO$_4$ | | | 60 | 480 | 0.6 |

The composition of crystalline phases (i.e., the mass ratio of components) in the porous ceramic structure 1 was identified and quantitated as follows. For produced samples, the crystalline phase of each particle was measured using an X-ray diffractometer (rotary anti-cathode X-ray diffractometer: RINT 2500 manufactured by Rigaku Corporation). Here, conditions for measuring X-ray diffraction were a CuKα-ray source, 50 kV, 300 mA, and 2θ=10° to 60°, and the resultant X-ray diffraction data was analyzed using commercial X-ray data analysis software.

The major axis, minor axis, and aspect ratio of MnWO$_4$, i.e., the metal oxide particles 2, were obtained by the aforementioned method. The open porosity of the porous ceramic structure 1 was measured by the Archimedes method using deionized water as a medium. As described above, pressure loss in the porous ceramic structure 1 decreases as the open porosity increases.

The NO oxidation temperature of the porous ceramic structure 1 was obtained as follows. First, the relationship between the temperature and an NO$_2$ conversion rate of the porous ceramic structure 1 was obtained. The NO$_2$ conversion rate was the ratio of NO converted into NO$_2$ in an No-containing derived gas that had been supplied to the porous ceramic structure 1 at a space velocity (SV) of 24400 h$^{-1}$ and passed through the porous ceramics structure 1. An initial gas contained 100 ppm of NO, 1500 ppm of CO, 5% of CO$_2$, 450 ppm of propane (C$_3$H$_8$), and 2% of H$_2$O. The analysis of the derived gas was conducted by Fourier transform infrared spectroscopy (FT-IR). The NO$_2$ conversion rate was approximately 0% at low temperatures, gradually increased to a maximum value with a rise in temperature, and then gradually decreased. The porous ceramics structure 1 had higher catalytic performance as the NO$_2$ conversion rate became higher. When the relationship between the NO$_2$ conversion rate and the temperature was obtained, the temperature was increased from the low temperature side in accordance with the above relationship, and a temperature at which the NO$_2$ conversion rate became one half of the maximum value was obtained as the NO oxidation temperature. The porous ceramics structure 1 had higher catalytic performance as the NO oxidation temperature became lower.

The thermal expansion coefficient of the porous ceramic structure 1 was a value measured by a method compliant with JIS R 1618. Specifically, a specimen with dimensions of 3 cells high, 3 cells wide, and 50 mm long was cut out from the honeycomb structure 10, and a thermal expansion coefficient in the A-axial direction (i.e., a direction parallel to the flow path in the honeycomb structure) was measured at a temperature of 40° C. to 800° C.

In Examples 1 to 5, the materials contained Mn$_2$O$_3$ and WO$_3$, and MnWO$_4$ was generated as the metal oxide particles 2 of the porous ceramic structure 1. In Example 1, the amount of WO$_3$ contained in the materials was too small to measure the mass % of MnWO$_4$.

Figure 9:
FIG. 9 shows an enlarged SEM image of the surface of a pore in the porous ceramic structure according to an example.

FIG. 9 shows an enlarged SEM image of the surface of a pore 121 in the porous ceramic structure 1 according to Example 4. In FIG. 9, there are metal oxide particles 2 (white portions in the drawing) on the surface of the pore 121 in the honeycomb structure 10.

In Examples 1 to 5, the porous ceramic structure 1 contained Mn and W. The Mn content in the porous ceramic structure 1 was in the range of 0.6 mass % to 2.0 mass % in terms of Mn$_2$O$_3$ and fell within the range of 0.5 mass % to 3.0 mass %. The W content in the porous ceramic structure 1 was in the range of 0.1 mass % to 1.4 mass % in terms of WO$_3$ and fell within the range of 0.1 mass % to 1.5 mass %. In Examples 2 to 5, the MnWO$_4$ content in the porous ceramic structure 1 was in the range of 0.3 mass % to 1.5 mass % and fell within the range of 0.2 mass % to 2.0 mass %.

In Examples 1 to 5, the open porosity was in the range of 60% to 62% and relatively high, so that pressure loss in the porous ceramic structure 1 was kept low. In Examples 1 to 5, the NO oxidation temperature was in the range of 460° C. to 500° C. and low, which indicated that the porous ceramic structure 1 had high catalytic performance. Examples 1 to 5 indicate that the NO oxidation temperature drops as the MnWO$_4$ content in the porous ceramic structure 1 increases.

In Examples 3 to 5, the MnWO$_4$ content in the porous ceramic structure 1 was in the range of 0.4 mass % to 1.5 mass %. In Examples 3 to 5, the NO oxidation temperature was lower than or equal to 480° C. and further low, which indicated that the porous ceramic structure 1 had yet higher catalytic performance.

In Examples 1 to 5, the thermal expansion coefficients at temperatures ranging from 40° C. to 800° C. were in the range of 0.3 to 0.4 and were hardly increased from the thermal expansion coefficient according to Comparative Example 1 described later (which included only the honeycomb structure 10 made of cordierite). Therefore, the porous ceramic structures 1 according to Examples 1 to 5 had thermal shock resistances approximately equivalent to that in Comparative Example 1. This suppression of an increase in the thermal expansion coefficient of the porous ceramic structure 1 is considered as a result of the W component accelerating the crystallization of cordierite and thereby suppressing the generation of amorphous materials.

Figure 10:
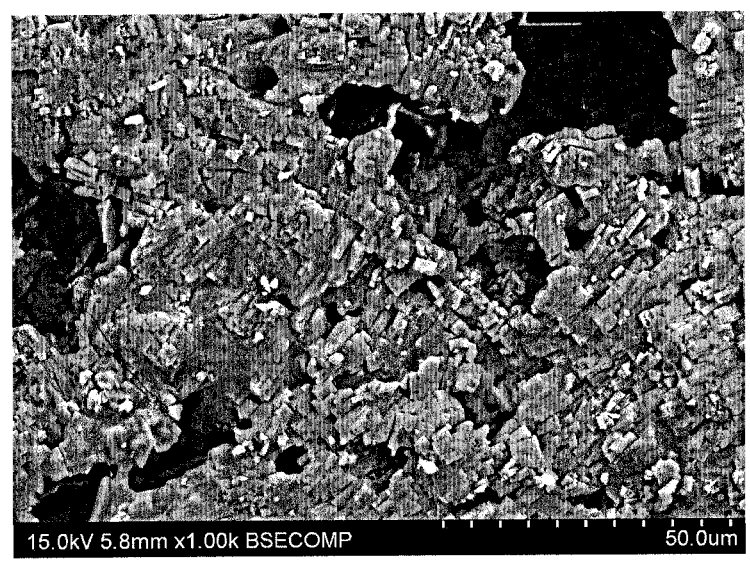
FIG. 10 shows an SEM image of the surface of a porous ceramic structure according to a comparative example.

Comparative Example 1 showed a test result for only a honeycomb structure 10 of cordierite that contained neither the metal oxide particles 2 nor the additive fine particles. FIG. 10 shows an SEM image of the surface of a porous ceramic structure 1 according to Comparative Example 1. In FIG. 10, the porous ceramic structure 1 is composed of only cordierite crystals as described above. In Comparative Example 1, the NO oxidation temperature was 540° C. and high, which indicated that the porous ceramic structure 1 had lower catalytic performance than in Examples 1 to 5.

In Comparative Example 2, the materials contained $Mn_2O_3$, but did not contain $WO_3$. Therefore, $MnWO_4$ was not generated in the porous ceramic structure 1. In Comparative Example 2, the porous ceramic structure 1 substantially did not contain W, so that there were no effects of W components accelerating the crystallization of cordierite and suppressing the generation of amorphous materials. Accordingly, the thermal expansion coefficient at temperatures ranging from 40° C. to 800° C. was 0.6 and high, and the thermal shock resistance was inferior to those in Examples 1 to 5 and Comparative Example 1.

As described above, the porous ceramic structure 1 includes the porous structure body (i.e., honeycomb structure 10) composed primarily of cordierite, and manganese (Mn) and tungsten (W) that are fixedly attached to the honeycomb structure 10. Accordingly, it is possible to reduce pressure loss in the porous ceramic structure 1 and to increase the $NO_2$ conversion rate of the porous ceramic structure 1. It is also possible to reduce the NO combustion temperature in the porous ceramic structure 1. Moreover, the conversion rate of converting CO into $CO_2$ and the conversion rate of converting CH into $CO_2$ and $H_2O$ can be increased. In other words, the above configuration allows the porous ceramic structure 1 to have low pressure loss and high catalytic performance.

As described above, Mn and W contained in the porous ceramic structure 1 are preferably components of the metal oxide particles 2 fixedly attached to the insides of the gas cavities (i.e., pores 121) in the honeycomb structure 10. The metal oxide particles 2 preferably include fixedly attached portions 21 located inside the honeycomb structure 10 and protrusions 22 contiguous with the fixedly attached portion 21 and protruding into the pores 121. This allows an increase in the ratio of contact between molecules targeted for conversion, such as NO, CO, or HC, and the Mn and W components in the pores 121. As a result, the porous ceramic structure 1 can achieve higher catalytic performance. Since the metal oxide particles 2 are fixedly attached directly to the honeycomb structure 10, pressure loss can be reduced more than in the case where the honeycomb structure 10 is subjected to processing such as a coating process to form a coating on the surfaces of the pores 121.

As described above, the W content in the porous ceramic structure 1 is preferably higher than or equal to 0.1 mass % and lower than or equal to 1.5 mass % in terms of $WO_3$. Accordingly, the porous ceramic structure 1 can achieve higher catalytic performance.

As described above, the Mn content in the porous ceramic structure 1 is preferably higher than or equal to 0.5 mass % and lower than or equal to 3.0 mass % in terms of $Mn_2O_3$. Accordingly, the porous ceramic structure 1 can achieve higher catalytic performance.

As described above, the metal oxide particles 2 preferably contain $MnWO_4$ particles. Accordingly, the porous ceramic structure 1 can achieve higher catalytic performance. More preferably, the $MnWO_4$ content in the porous ceramic structure 1 is higher than or equal to 0.2 mass % and lower than or equal to 2.0 mass %. Accordingly, the porous ceramic structure 1 can achieve yet higher catalytic performance.

The aspect ratio of the $MnWO_4$ particles is preferably higher than or equal to 5.5. In this way, if the $MnWO_4$ particles have anisotropy, the surface area of the particles increases, and it is possible to increase the ratio of contact between $MnWO_4$ and the aforementioned molecules targeted for conversion in the pores 121. As a result, the porous ceramic structure 1 can achieve further higher catalytic performance.

As described above, the $MnWO_4$ particles preferably have particulate or fibrous shapes. The $MnWO_4$ particles preferably include fixedly attached portions 21 existing at the grain boundaries of cordierite crystals 3 in the honeycomb structure 10, and protrusions 22 protruding from the grain boundaries into the pores 121. This structure is achieved by the W components accelerating the crystallization of cordierite and thereby suppressing the generation of amorphous materials during production of the porous ceramic structure 1. This structure of the porous ceramic structure 1 suppresses an increase in the thermal expansion coefficient of the porous ceramic structure 1. As a result, it is possible to suppress deterioration in the thermal shock resistance of the porous ceramic structure 1.

The porous ceramic structure 1 and the method of producing the porous ceramic structure 1 described above may be modified in various ways.

For example, the shapes of the fine particles of $MnWO_4$ are not limited to the particulate or fibrous shape, and may be changed in various ways. The fixedly attached portions 21 of the fine particles of $MnWO_4$ do not necessarily have to exist at the grain boundaries of cordierite crystals 3, and the protrusions 22 also do not necessarily have to protrude from the grain boundaries.

The aspect ratio of the fine particles of $MnWO_4$ may be lower than 5.5, and the fine particles of $MnWO_4$ do not necessarily have to have anisotropy. The major axes, minor axes, and mean particle diameter of the fine particles of $MnWO_4$ are not limited to the ranges described above.

The $MnWO_4$ content in the porous ceramic structure 1 may be lower than 0.2 mass %, and may be higher than 2.0 mass %.

The Mn content in the porous ceramic structure 1 may be lower than 0.5 mass % and higher than 3.0 mass % in terms of $Mn_2O_3$.

The W content in the porous ceramic structure 1 may be lower than 0.1 mass % and higher than 1.5 mass % in terms of $WO_3$.

In the porous ceramic structure 1, Mn and W do not necessarily have to be contained as the components of the metal oxide particles 2 that include the fixedly attached portions 21 and the protrusions 22, and may be contained in other forms. As an example of the other forms, Mn and W may be components of the metal oxide particles 2 that are embedded in their entirety inside the honeycomb structure 10, or may be fixedly attached to the honeycomb structure 10 in a form other than the metal oxide particles 2.

In the porous ceramic structure 1, the shape of the aforementioned structure body is not limited to a honeycomb shape, and may be any other shape (e.g., substantially circular cylindrical shape) other than the honeycomb shape.

The method of producing the porous ceramic structure 1 is not limited to the example described above, and may be changed in various ways.

The porous ceramic structure 1 may be used in applications other than CSFs of DPFs.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL AVAILABILITY

The present invention is applicable to filters that collect particulate matter, e.g., DFPs that collect particulate matter in exhaust gases emitted from diesel engines.

REFERENCE SIGNS LIST

1 Porous ceramic structure
2 Metal oxide particle
10 Honeycomb structure
21 Fixedly attached portion
22 Protrusion
S11 to S13 Step

The invention claimed is:

1. A porous ceramic structure comprising:
   a porous structure body composed primarily of cordierite; and
   manganese and tungsten fixedly attached to said structure body,
   wherein said manganese and said tungsten are components of a metal oxide particle fixedly attached to an inside of a pore of said structure body, and
   said metal oxide particle has:
   a fixedly attached portion located inside said structure body; and
   a protrusion contiguous with said fixedly attached portion and protruding into said pore.

2. The porous ceramic structure according to claim 1, having a tungsten content higher than or equal to 0.1 mass % and lower than or equal to 1.5 mass % in terms of $WO_3$.

3. The porous ceramic structure according to claim 1, having a manganese content higher than or equal to 0.5 mass % and lower than or equal to 3.0 mass % in terms of $Mn_2O_3$.

4. The porous ceramic structure according to claim 1, wherein
   said metal oxide particle includes an $MnWO_4$ particle.

5. The porous ceramic structure according to claim 4, having an $MnWO_4$ content higher than or equal to 0.2 mass % and lower than or equal to 2.0 mass %.

6. The porous ceramic structure according to claim 4, wherein
   said $MnWO_4$ particle has an aspect ratio higher than or equal to 5.5.

7. The porous ceramic structure according to claim 4, wherein
   said $MnWO_4$ particle has a particulate or fibrous shape, and
   said $MnWO_4$ particle has:
   said fixedly attached portion existing at a grain boundary of cordierite crystals in said structure body; and
   said protrusion protruding from said grain boundary into said pore.

* * * * *